(12) United States Patent
Takagi et al.

(10) Patent No.: US 6,440,037 B2
(45) Date of Patent: Aug. 27, 2002

(54) CONTROL SYSTEM FOR VEHICLE HAVING CONTINUOUSLY VARIABLE TRANSMISSION

(75) Inventors: Isao Takagi, Okazaki; Hirofumi Kubota, Mishima, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/799,563

(22) Filed: Mar. 7, 2001

(30) Foreign Application Priority Data

Mar. 10, 2000 (JP) ........................................ 2000-067560

(51) Int. Cl.⁷ ........................ B60K 41/12; B60K 41/14; F16H 9/00; F16H 61/00
(52) U.S. Cl. ................. 477/37; 123/339.1; 123/339.14; 123/339.18; 701/51; 701/54; 701/110; 477/111
(58) Field of Search ............................ 477/37, 107, 43, 477/39, 48, 111, 44, 49, 109, 98, 906, 46, 110, 174, 173; 701/54, 58, 60, 51, 111, 103, 101, 110; 123/295, 319, 339.1, 339.14, 339.18, 339.17; 180/197

(56) References Cited

U.S. PATENT DOCUMENTS

| | | | |
|---|---|---|---|
| 4,720,793 A | | 1/1988 | Watanabe et al. |
| 4,875,892 A | * | 10/1989 | Sueda |
| 4,995,283 A | * | 2/1991 | Sawasaki et al. |
| 5,007,147 A | * | 4/1991 | Imai et al. |
| 5,713,815 A | * | 2/1998 | Funatsu et al. ............... 477/46 |
| 5,976,054 A | * | 11/1999 | Yasuoka ..................... 477/46 |
| 6,063,003 A | * | 5/2000 | Kubota et al. ................ 477/43 |
| 6,066,070 A | * | 5/2000 | Ito et al. ..................... 477/43 |
| 6,090,007 A | * | 7/2000 | Nakajima et al. ............ 477/46 |
| 6,148,257 A | * | 11/2000 | Katakura et al. ............. 701/54 |
| 6,188,944 B1 | * | 2/2001 | Kolmanovsky et al. ....... 701/54 |
| 6,345,221 B2 | * | 2/2002 | Hattori et al. ................ 701/51 |
| 6,352,491 B2 | * | 3/2002 | Mashiki et al. ............. 477/109 |
| 2001/0041644 A1 | * | 11/2001 | Yasuoka et al. ............. 477/37 |
| 2001/0044358 A1 | * | 11/2001 | Taniguchi et al. ........... 477/44 |
| 2001/0044687 A1 | * | 11/2001 | Mitani et al. ................ 710/54 |

FOREIGN PATENT DOCUMENTS

| | | | |
|---|---|---|---|
| JP | 62-110535 | | 5/1987 |
| JP | 6430842 | * | 2/1989 |
| JP | 3-72867 | | 11/1991 |
| JP | 11-78619 | | 3/1999 |

* cited by examiner

Primary Examiner—Douglas C. Butler
(74) Attorney, Agent, or Firm—Oblon, Spivak, McClelland, Maier & Neustadt, P.C.

(57) ABSTRACT

A control system for a vehicle including a continuously variable is constructed: such that a target output of a prime mover for achieving a target driving force is determined on the basis of the target driving force; such that a target output speed is determined on the basis of the target output; such that a gear ratio of the continuously variable transmission is controlled so that an output speed of the prime mover may be the target output speed; such that a target output torque of the prime mover for achieving the target driving force is determined on the basis of the target driving force; and such that a load of the prime mover is controlled on the basis of the target output torque. The control system further comprises a corrector for correcting a control quantity to control the load of the prime mover so that the output torque of the prime mover may have the sum of the target output torque and an output torque for keeping the idle run of the prime mover.

12 Claims, 6 Drawing Sheets

CONTROL SYSTEM FOR VEHICLE HAVING CONTINUOUSLY VARIABLE TRANSMISSION

BACKGROUND OF THE INVENTION

1. Field of the Invention

The present invention relates to a control system for a vehicle having a continuously variable transmission capable of changing a gear ratio continuously.

2. Related Art

The continuously variable transmission can optionally set the gear ratio, so that it can set, when arranged on the output side of an engine for the vehicle, an engine speed resulting in a minimum fuel consumption required for each load such as throttle opening. Therefore the continuously variable transmission is a system effective for reducing the exhaust gas and improving the fuel economy.

An ordinary continuously variable transmission, as employed as a transmission of the vehicle, is constructed such that a transmission member for transmitting power is interposed between an input side rotary member and an output side rotary member while being in contact with these rotary members, to continuously change the gear ratio or the ratio between the speeds of the input side rotary member and the output side rotary member by continuously changing contact positions between the transmission member and the individual rotary members. One specific example is a belt type continuously variable transmission in which a belt is made to run on an input pulley and an output pulley, each of which has a variable groove width, or a toroidal type continuously variable transmission in which a tiltable power roller is sandwiched between a pair of discs having toroidal faces.

When such a continuously variable transmission is employed in the vehicle which is powered by an internal combustion engine such as a gasoline engine, the speed of the internal combustion engine can be controlled by the continuously variable transmission, and an output torque of the same can be controlled with a load such as throttle opening or fuel injection rate, so that the vehicle can be driven with minimum fuel consumption while satisfying a demand for driving force.

According to the continuously variable transmission, the gear ratio can be continuously changed, and the output of the prime mover such as the engine is continuously changed. In Japanese Patent Publication No. 3-72867 (JP-B-3-72867), therefore, there is disclosed a control system which is constructed to perform a highly efficient run by making effective use of the characteristics of the continuously variable transmission. In the disclosed system, a target driving force is determined from the amount of depression of an accelerator pedal and the vehicle speed to determine a target engine output, a target throttle opening and a target engine speed corresponding to the target driving force, and to determine a target gear ratio on the basis of the target engine speed and the vehicle speed. In the disclosed system, moreover, the target engine output and the target gear ratio are determined on the basis of an optimum fuel economy curve on which the fuel consumption rate is minimum.

In order to continue an autonomous rotation of the internal combustion engine such as the gasoline engine, a minimum speed has to be kept no less than a predetermined value. Such an idle speed control (i.e., ISC) is executed by controlling the throttle opening and the fuel injection rate so that an idling speed of the internal combustion engine may be a predetermined target value. In this case, the internal combustion engine acts as the prime mover for the entire vehicle, and the combustion of fuel is different depending upon temperature of the internal combustion engine. In order to keep the idle run, therefore, the control quantity of the internal combustion engine has to be corrected according to operating conditions such as load on accessories including an air conditioner and the temperature of the internal combustion engine.

In the aforementioned control system disclosed in Japanese Patent Publication No. 3-72867, however, a target output torque of the prime mover is determined on the basis of output demand such as accelerator depression, and the throttle opening and the fuel injection rate are so controlled as to equalize the output torque of the internal combustion engine to the target output torque. Even if there is need for a correction of the engine load based on the load on the accessories, which hardly appears as the output demand, therefore, the output torque of the internal combustion engine is not corrected to augment. As a result, it may become difficult to keep the idle run stably, when the load on the accessories rises.

SUMMARY OF THE INVENTION

An object of the invention is to provide a control system capable of executing an idle run properly in a vehicle provided with a continuously variable transmission.

In order to achieve this object, therefore, the invention is constructed to correct the output torque so that the idle run may be kept stable. More specifically, the control system of the invention is intended to control a vehicle having the continuously variable transmission mounted thereon.

According to an aspect of the invention, there is provided a control system for a vehicle including a continuously variable transmission, comprises: target output calculating means for determining a target output of a prime mover for achieving a target driving force; target output speed calculating means for determining a target output speed on the basis of the target output; gear ratio control means for controlling a gear ratio of the continuously variable transmission so that the output speed of the prime mover may be the target output speed; target output torque calculating means for determining a target output torque of the prime mover for achieving the target driving force; and load control means for controlling a load of the prime mover on the basis of the target output torque. This control system further comprises correction means for correcting a control quantity to control the load of the prime mover so that the output torque of the prime mover may have a sum of the target output torque and an output torque for keeping the idle run of the prime mover.

According to the invention, therefore, the target output torque of the prime mover is determined on the basis of the target driving force, and the load of the prime mover is so corrected that the output torque for keeping the idle run of the prime mover may have a sum of the target output torque and an output torque for keeping the idle run of the prime mover. As a result, the invention makes it possible to perform the control of the prime mover reflecting not only the target driving force but also the load necessary for the idle run, so that the idle run can be kept proper.

On the other hand, the correction means of the invention includes means for determining a corrected output torque for keeping the idle run of the prime mover and correcting the target output torque on the basis of the corrected output torque.

According to this construction, the target output torque, as determined on the basis of the target driving force, is corrected with the corrected output torque for keeping the idle run, and the load of the prime mover is controlled on the basis of the corrected target output torque, so that the idle run can be kept proper.

The control system of the invention can further comprise target speed correction means for correcting the target output speed on the basis of an accessory load.

In this construction, the target output speed determined on the basis of the target driving force is corrected on the basis of the accessory load. When the output torque is corrected to keep the idle run, therefore, the output speed of the prime mover is corrected accordingly. Therefore, the prime mover can be driven with a minimum fuel consumption by making effective use of the continuously variable transmission.

In this invention, still moreover, the target speed correction means includes means for determining an accessory load output for the accessory load and correcting the target output speed on the basis of the accessory load output.

In this construction, the target output speed of the prime mover is a value including the accessory load output, so that the output speed of the prime mover is optimized even in the presence of the accessory load.

In the invention, moreover, the correction means can include means for determining a corrected output to keep the idle run of the prime mover and correcting the target output on the basis of the corrected output.

With this construction, the target output providing the basis for determining the target output speed contains the corrected output for the idle run, so that the output speed of the prime mover can be proper for keeping the idle run and for driving the vehicle with minimum fuel consumption.

In the invention, further more, the correction means can include means for determining a corrected driving force for keeping the idle run of the prime mover and correcting the target driving force on the basis of the corrected driving force.

With this construction, the target driving force is corrected with the corrected driving force necessary for the idle run so that the target output speed and the target output torque of the prime mover are determined on the basis of the target driving force corrected. Therefore, the controls of the output torque and the output speed including the load for keeping the idle run can be executed to keep the idle run properly and to effect the drive with minimum fuel consumption.

In the invention, furthermore, the correction means can include means for changing a correction value for correcting the control quantity into a smaller value when the correction value exceeds a predetermined value during the running of the vehicle.

With this construction, the correction amounts of the target output torque, the target output speed, the target output and the target driving force are restricted when a correction value for correcting them exceeds a predetermined value. As a result, the prime mover can be prevented from being driven in a manner largely deviating from an optimum state.

The above and further objects and novel features of the invention will more fully appear from the following detailed description when the same is read in connection with the accompanying drawings. It is to be expressly understood, however, that the drawings are for the purpose of illustrations only and are not intended as a definition of the limits of the invention.

DETAILED DESCRIPTION OF THE PREFERRED EMBODIMENT

Figure 6:
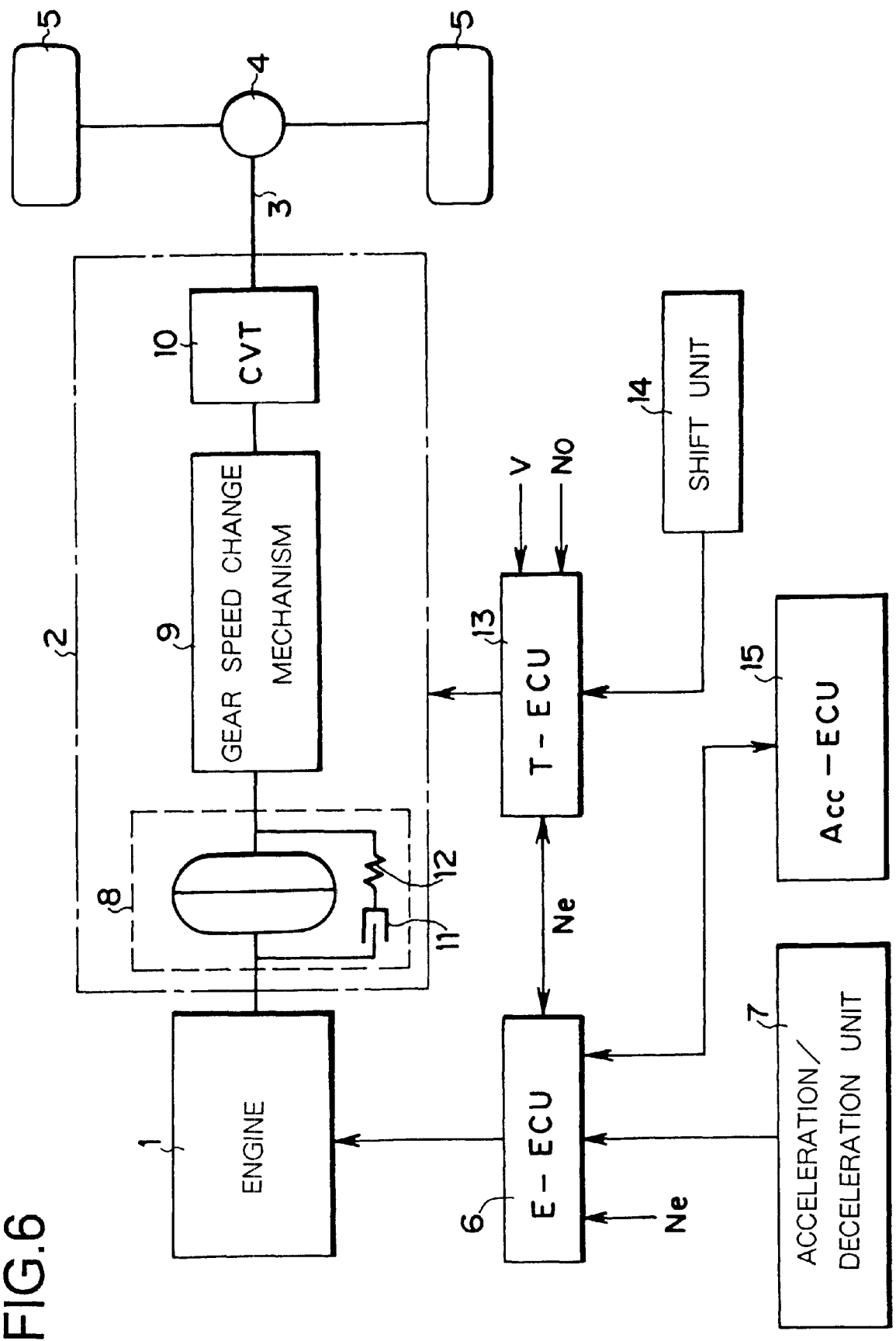
FIG. 6 is a block diagram conceptionally showing a running line and a control line of a vehicle to be controlled by the control system of the invention.

The invention will be described in connection with its specific embodiment. Here will be described one example of a power transmission line of a vehicle to which the invention is applied. In FIG. 6, a prime mover 1 is connected to a speed changing mechanism 2, an output shaft 3 of which is connected through a differential 4 to right and left drive wheels 5. Here, the prime mover 1 includes a variety of power sources to be employed in the vehicle, such as an internal combustion engine, e.g., a gasoline engine or a Diesel engine, an electric motor, e.g., a motor, and a combined unit of an internal combustion engine and an electric motor. In the following description, the prime mover 1 is exemplified by: the so-called "direct injection gasoline engine" which is enabled to perform a homogeneous combustion or a laminar combustion by injecting fuel directly into a cylinder and by controlling the injection rate and timing; or a gasoline engine which is provided with an electronic throttle valve for controlling the throttle opening (the engine load) electrically and freely.

This engine 1 is so constructed to be electrically controlled and therefore equipped with an electronic control unit (E-ECU) 6 which is composed mainly of a microcomputer. This electronic control unit 6 is constructed to control at least the output of the engine 1. As data for this control, there are inputted to the electronic control unit 6 a demanded drive quantity including an output speed (or an engine speed) Ne and an accelerator depression or opening θ.

In short, the demanded drive quantity is a signal for increasing/decreasing the output of the engine 1. The demanded drive quantity include: an operation amount signal of an acceleration/deceleration unit 7 such as an accelerator pedal to be operated by a driver; a signal obtained by processing the operation amount signal electrically; and a demanded drive signal coming from a (not-shown) cruise control system for keeping the vehicle speed at a set value when the engine 1 is provided with an electronic throttle valve.

On the other hand, the speed changing mechanism 2 is constructed to include a fluid coupling unit 8, a gear speed-change mechanism 9 and a continuously variable transmission (CVT) 10. The fluid coupling unit 8 is a device for transmitting a torque between an input side member and an output side member through a fluid such as working oil, and is exemplified by a torque converter adopted in an ordinary vehicle. The fluid coupling unit 8 is also equipped with a lock-up clutch 11. This lock-up clutch 11 is constructed to couple the input side member and the output side member directly by mechanical means such as a frictional disc and is equipped with a damper 12 made of an elastic member such as a coil spring for damping shocks. When the fluid coupling unit, 8 is provided to drive the engine 1 continuously even while the vehicle is stopped, an automatic clutch to be automatically interrupted on the basis of states of the vehicle can be employed in place of the fluid coupling unit 8.

The fluid coupling unit 8 is connected at its input member to an output member of the engine 1 and at its output member to an input member of the gear speed-change mechanism 9. This gear speed-change mechanism 9 is equipped with a plurality of gears and is constructed to change the gear ratio, i.e., the ratio between the speeds of the input member and the output member appropriately and to rotate the output member in the opposite direction to the input member by changing torque transmission passages defined by these gears. As this gear speed-change mechanism 9, there can be adopted a mechanism using a single-pinion type planetary gear mechanism, a double-pinion type planetary gear mechanism or a Ravignaux type planetary gear mechanism, or a mechanism which is constructed to selectively connect pairs of gears always meshing with each other to the output member and the input member by means of a synchronously connecting mechanism (i.e., a synchronizer).

Here, this gear speed-change mechanism 9 is provided for compensating it that the range of the gear ratio to be set by the continuously variable transmission 10, as will be described, is narrow, that the continuously variable transmission 10 lacks the so-called "reverse function" to rotate its output side member in the opposite direction to its input side member, or that the continuously variable transmission 10 has its power transmission efficiency dropped in the region of a predetermined gear ratio. When the gear ratio to be set by the continuously variable transmission 10 can satisfy the demand for the vehicle, therefore, a mechanism having only the reverse function may be adopted as the gear speed-change mechanism 9.

The continuously variable transmission 10, as shown in FIG. 6, is a mechanism capable of steplessly (or continuously) changing the ratio between the speeds of its input side and output side members, i.e., the gear ratio, and can be exemplified by the aforementioned belt-type or toroidal type.

The control of the individual states of application/release and slipping half-application (half-engagement) of the lock-up clutch 11 in the transmission mechanism 2, the control of the gear ratio in the gear speed-change mechanism 9, and the control of the gear ratio in the continuously variable transmission 10 are basically made on the basis of the running state of the vehicle. For this control, there is provided an electronic control unit (T-ECU) 13 which is also composed mainly of a microcomputer.

This electronic control unit 13 is so connected to the aforementioned electronic control unit 6 for the engine as to perform data communication, and receives data such as the vehicle speed V or the output shaft speed No of the transmission mechanism 2 as its control data. There is further provided a shift unit 14 for bringing the transmission mechanism 2 selectively into the individual states: a stop state Parking); a backward state (Reverse); a neutral state (Neutral); an automatic forward state (Drive: D) or an automatic speed-change mode for automatically setting the gear ratio according to the running state of the vehicle; and a manual state Manual: M) or a manual speed-change mode for setting the shifting state manually. This shift unit 14 is electrically connected with the electronic control unit 13.

The aforementioned engine 1 acts as the prime mover for the entire vehicle, and therefore its output power is consumed not only for driving the vehicle but also for energizing the accessories. These accessories include an air conditioner, an oil pump for the power steering system, an alternator and/or a defogger for windows (although none of them is shown). There is also provided an electronic control unit (ACC-ECU) 15 for controlling those accessories. This electronic control unit 15 is so connected with the electronic control unit 6 for the engine as to perform data communication.

Figure 1:
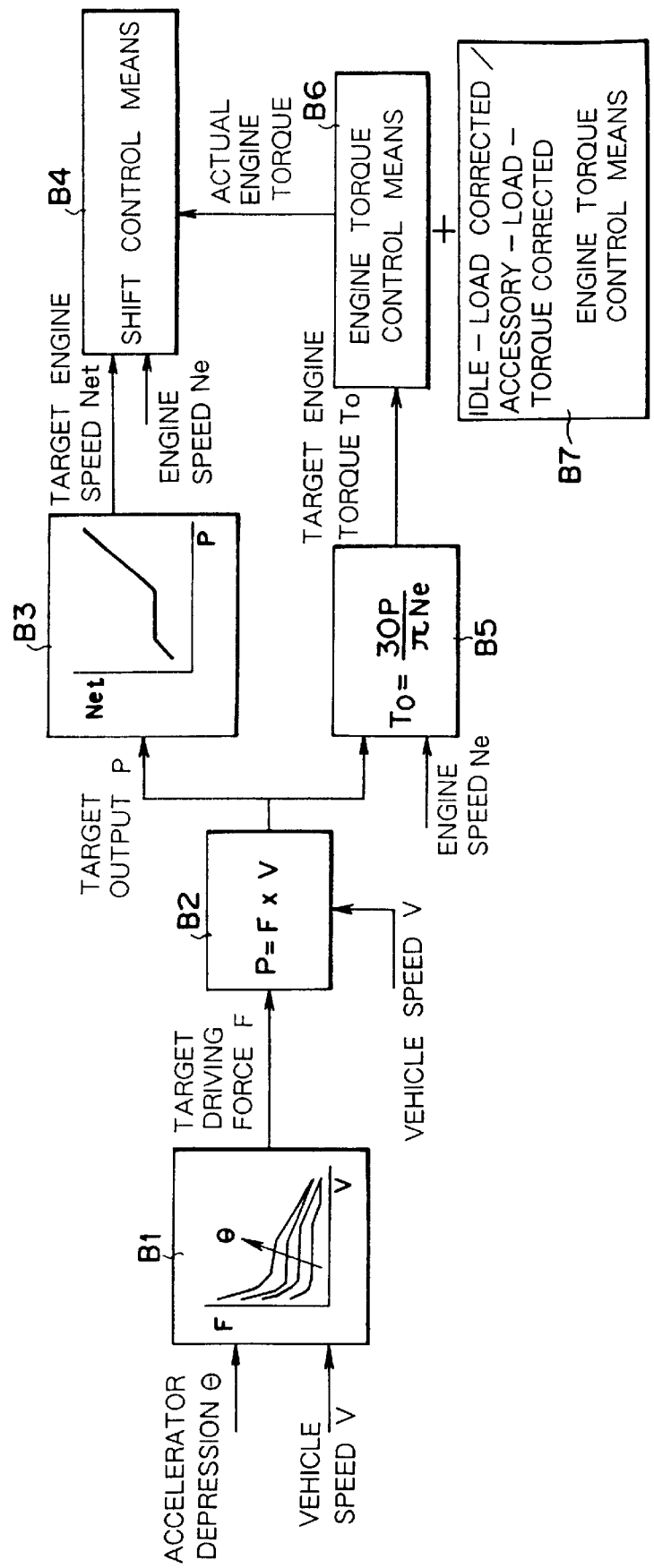
FIG. 1 is a block diagram showing a control process to be executed by a control system according to the invention, for correcting a target engine torque.

The control system according to the invention is basically constructed to control the engine 1 and the continuously variable transmission 10 on the basis of a demanded drive quantity and a running state of the vehicle and to make corrections for the idle run or corrections based on the accessory loads. FIG. 1 is a block diagram showing the controls of the engine speed, the engine torque and their corrections. As shown in first Block B1, a target driving force F is determined on the basis of the demanded drive quantity such as an accelerator opening θ and a vehicle speed V. Here, the vehicle speed V may be replaced by speed of another suitable rotary member which is in a one-to-one relation with the vehicle speed V, such as the output shaft speed No of the speed changing mechanism 2.

The target driving force F, as based on those accelerator opening θ and vehicle speed V, is determined on the basis of a pre-prepared map. Specifically, the relation between the vehicle speed V and the target driving force F is mapped in advance by using the accelerator opening θ as a parameter. In this case, the target driving force F is determined to reflect the characteristics of a target vehicle.

As shown in Block B2, a target output P is then determined on the basis of the target driving force F and the vehicle speed V or a detected value corresponding thereto. Specifically, this target output P can be calculated as a product of the target driving force F and the vehicle speed V.

The target output P thus determined is employed on one hand (in Block B3) to determine a target output speed Net of the engine 1. Specifically, the engine speed for minimizing the fuel economy for a predetermined output can be foreseen for each engine 1 so that it can be prepared as a map (or a target engine speed table). In Block B3, therefore, the target engine speed Net is determined on the basis of the target output P and the target engine speed table. On the basis of this target engine speed Net and an actual engine speed Ne at that time, the gear ratio is determined (in Block B4) by shift control means. Then, the continuously variable transmission 10 is controlled for that gear ratio.

On the basis of the target output P, on the other hand, a target engine torque To is determined (in Block B5). Specifically, the target output P is divided by the actual engine speed Ne at that time to determine the target engine torque To (To=30P/π·Ne). The engine 1 is so controlled (in Block B6) by engine torque control means that an actual engine torque outputted by the engine 1 may be the target engine torque To.

Here, by corrected engine torque control means shown in Block B7, the target engine torque To is corrected with the idle load and the accessory load, and the engine torque control means determines load such as throttle opening or fuel injection rate on the basis of a corrected target engine torque To and controls the engine 1 on the basis of a determined load. This idle load correction is a control similar to a correction control which is performed in an ordinary engine of the prior art. When engine water temperature is low at the end of the start of the engine 1, for example, the air intake rate or the fuel injection rate is corrected to increase and thereafter gradually reduced as the engine water temperature rises. The accessory load correction is made, on the other hand, to keep the idling speed at a target value by increasing the air intake rate or the fuel injection rate on the basis of data coming from the electronic control unit 15 for the accessories in response to load for driving the accessories such as the air conditioner or the oil pump of the power steering system. These controls are executed while being followed by the feedback control of the air intake rate or the fuel injection rate, as based on the engine speed, and the learning control for changing the reference control quantity when the feedback control quantity exceed a predetermined threshold value.

The torque actually outputted by the engine 1 due to the controls of the engine torque control means and the corrected engine torque control means, as described above, is a torque which is corrected on the basis of the engine water temperature and the accessory load at the time of idling. The load such as the throttle opening or the fuel injection rate of the engine 1 is so controlled as to equalize the output torque to the corrected torque. Therefore, the idle run is kept so proper as to equalize the idling speed to the target value.

As has been described hereinbefore, the control system according to the invention is constructed such that the engine load such as the throttle opening is controlled to generate an output torque based on the demanded drive quantity and such that the engine speed is controlled by the continuously variable transmission 10 to minimize the fuel consumption based on the demanded drive quantity. These controls are illustrated in a diagram of FIG. 2. During the running, the engine speed is controlled according to the optimum running line, as indicated by a solid line. When the engine torque is corrected in the aforementioned manner, therefore, the engine torque is corrected to increase. When a running point based on the demanded drive quantity is in the running state, as indicated by point A in FIG. 2, therefore, the running state is shifted to a state indicated by point B, because the corrected engine torque by the idle load correction or the accessory load correction is added. In other words, the running state deviates from the optimum running line on which the fuel consumption is minimized, so that the fuel economy becomes lower although the idle run can be properly executed. Here will be described a control for eliminating such problem.

Figure 3:
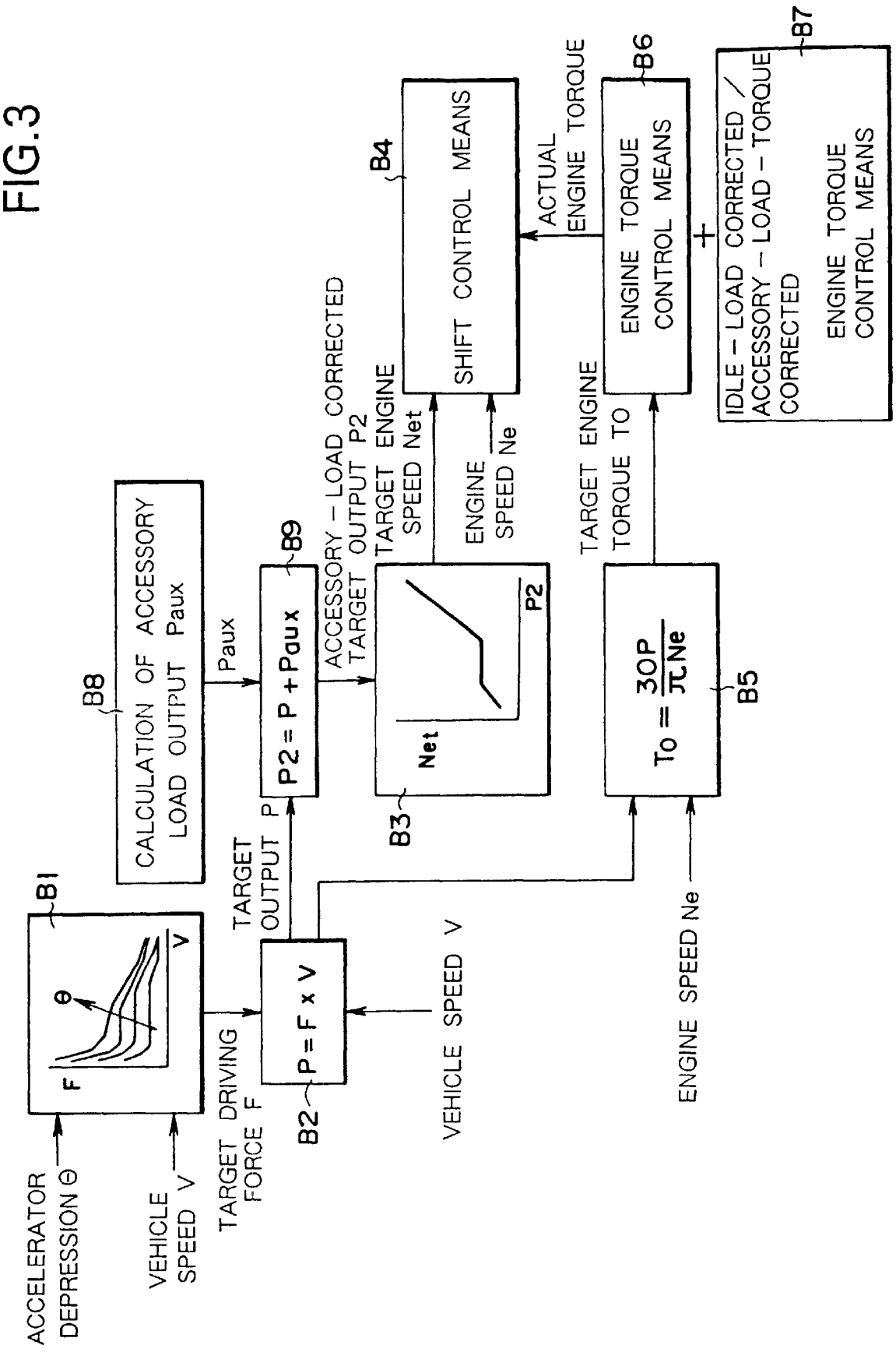
FIG. 3 is a block diagram showing a control process to be executed by the control system according to the invention, for determining a target engine speed by correcting not only the target engine torque but also a target output.

This control is exemplified in FIG. 3 and is made such that the target output P for determining the target engine speed Net in the control system shown in FIG. 1 is corrected with an accessory load output Paux. Specifically, there is calculated (in Block B8) the accessory load output Paux necessary for driving the accessory such as the air conditioner. On the other hand, the target output P based on the demanded driving force is calculated as indicated in Block B2, and a target output P2 corrected with the accessory load is calculated (in Block B9) by adding the accessory load output Paux to that target output P. On the basis of the target output P2 thus corrected, the target engine speed Net is determined (in Block B3). The remaining controls are similar to those shown in FIG. 1.

In the example shown in FIG. 3, therefore, an engine speed proper for the corrected target output P2, that is, an engine speed for the minimum fuel consumption is employed as the target engine speed Net so that the gear ratio of the continuously variable transmission 10 is controlled to achieve that target engine speed Net. On the other hand, the engine output torque is controlled to a torque which is the sum of the target output torque determined on the basis of the demanded drive quantity and the corrected torque corrected with the idle load and the accessory load.

Figure 2:
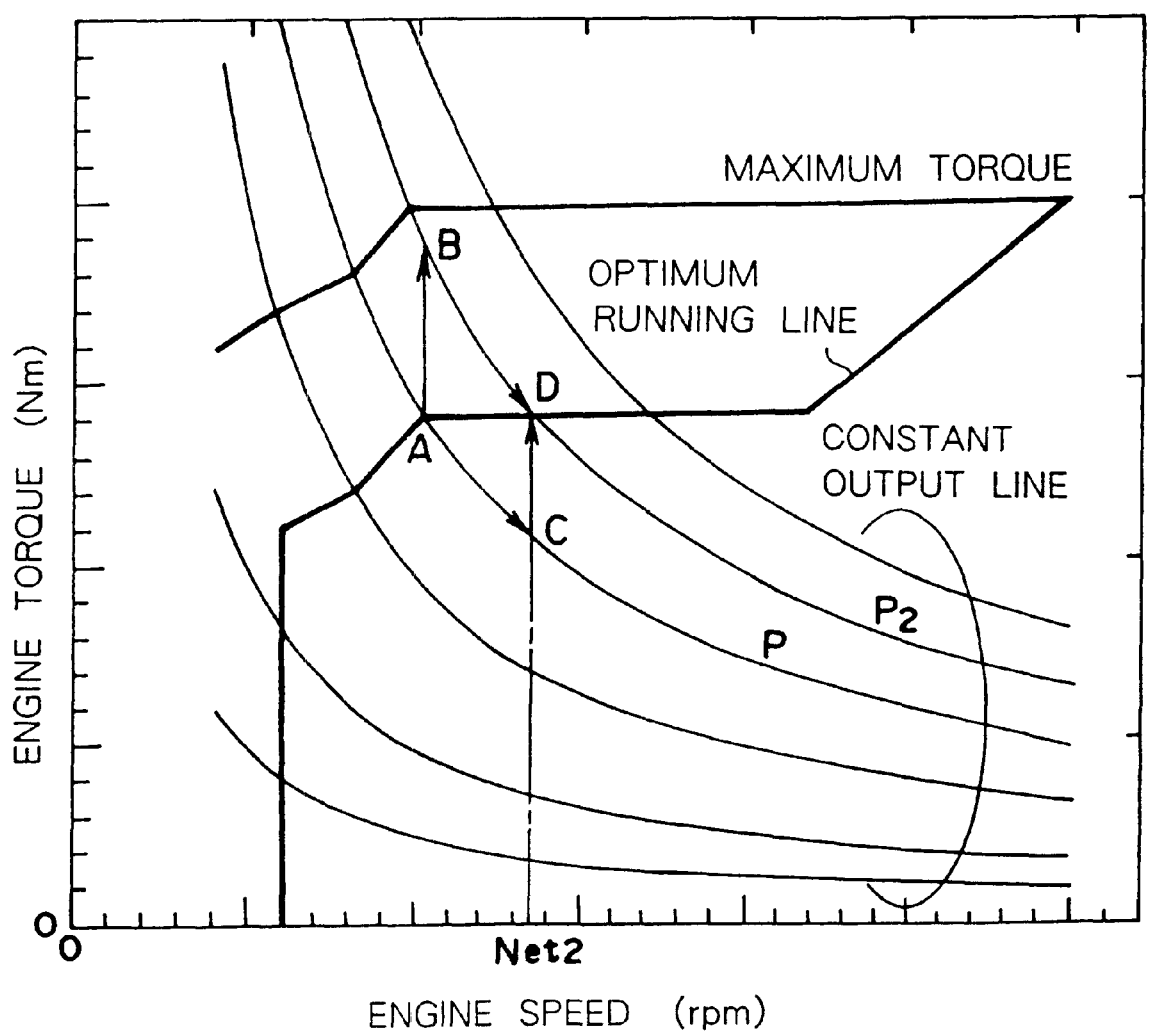
FIG. 2 is a diagram illustrating a running point in the case where the control is executed by the control system of the invention.

This will be described with reference to FIG. 2. When a running point determined on the basis of the accelerator opening θ and the vehicle speed V is indicated by point A, the target output P is corrected with the accessory load, and the target engine speed Net is determined on the basis of the corrected target output P2. Then, the target engine speed Net has a value Net2, as indicated in FIG. 2. The running point, as determined both by the target engine torque To determined on the basis of the accelerator opening θ and the vehicle speed V, i.e., the target engine torque To before corrected and by the target engine speed Net2 determined on the basis of the corrected target output P2, is indicated by point C in FIG. 2. The running state at point C is located on the constant output line of the uncorrected target output P. In the example shown in FIG. 3, the corrected torque, as corrected with the idle load and the accessory load, is added to that output torque so that the running state to be actually set is located at point D on the constant output line of the corrected target output P2 and on the optimum running line for the minimum fuel consumption. Even in the case of the corrections of the idle load and the accessory load, more specifically, the engine 1 can be run on the optimum running line of the minimum fuel consumption, so that the fuel economy can be improved according to the control example shown in FIG. 3.

Here, the engine load such as the accelerator opening at the time of running of the vehicle is a load incorporating the idle load or the accessory load added to the load based on the demanded drive quantity such as the accelerator opening. As a result, the vehicle is driven in a manner deviating from the optimum running line on which the fuel consumption is minimized if the corrected torque is merely added to the target engine torque, as has been described with reference to FIG. 1. On the other hand, the idle load such as the air intake rate (e.g., the throttle opening or the opening of the idle speed control valve) for keeping the idle run or the fuel injection rate is set at first to a relatively high value so as to ensure the rotation of the engine 1, and thereafter gradually lowered by performing a learning control at the actual idle run. Usually, a considerably high load estimating the reliability of the rotations of the engine 1 is set as the idle load which is employed when the power source such as the battery is disconnected so that the data stored by the learning control are lost or when the vehicle first runs. When the vehicle is driven before the learning control in the idle run is not sufficiently executed after the battery was exchanged, therefore, an initially high value is held as the idle load. As a result, the run is continued in a high-load state in which the air intake rate or the fuel injection rate is relatively high, so that the fuel economy may be possibly degraded.

Figure 4:
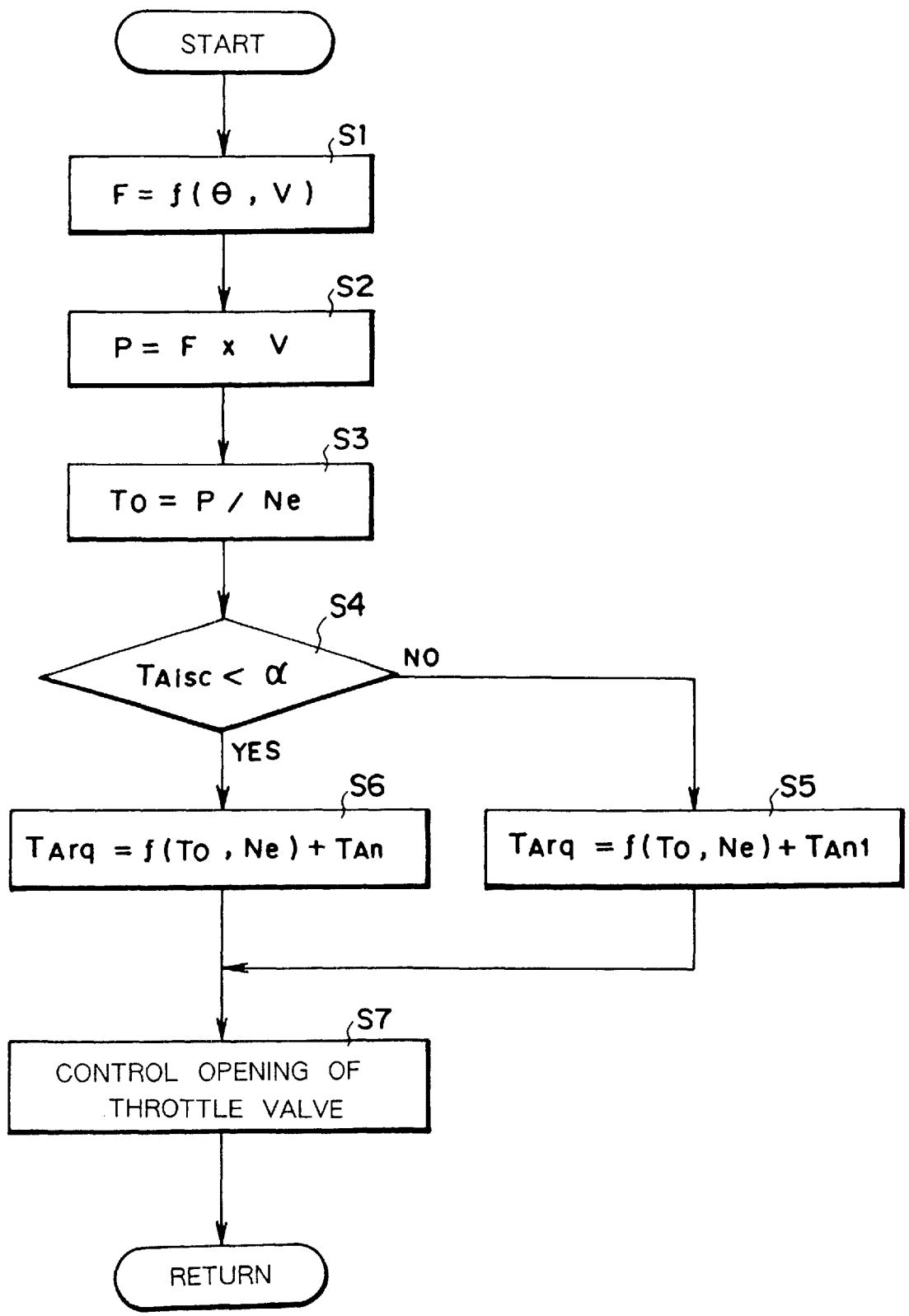
FIG. 4 is a flow chart for explaining a control to be executed by the control system according to the invention, for suppressing an ISC-demanded throttle opening.

In order to avoid this disadvantage, the control system of the invention can be constructed in the following manner. When the idling speed is to be controlled by a throttle valve (e.g., the electronic throttle valve), for example, the opening (or the idle load) set to keep the idle run is restricted to a predetermined value while the vehicle is running. A flow chart for explaining this control example is shown in FIG. 4. In this example, the engine torque is controlled with the throttle opening. In FIG. 4, the target driving force F is first determined (at Step S1) on the basis of the demanded drive quantity, e.g., the accelerator opening θ and the vehicle speed V. This is similar to the control of Block B1, as shown in FIGS. 1 and 3. Next, the target output P is determined (at Step S2) on the basis of the target driving force F and the vehicle speed V. This is similar to the control of Block B2, as shown in FIGS. 1 and 3. Moreover, the target engine torque To is calculated (at Step S3) on the basis of the target output P and the engine speed Ne. This is similar to the control of Block B5, as shown in FIGS. 1 and 3.

Then, it is decided (at Step S4) whether or not an ISC-demanded throttle opening TAisc based on the idle speed control (ISC) is lower than a predetermined reference value a. This ISC-demanded throttle opening TAisc is the sum of a corrected opening degree corrected with the water temperature and a basic opening degree set at that time. This basic opening degree is either an initial value set at first or a value corrected from the initial value by the learning control. Moreover, the reference value a employed at Step S4 is such a value as predetermined by adding a safety value to a standard throttle opening TAn in the idle speed control.

When the battery is once removed or when the idle run is not sufficiently made thereafter, the basic opening degree is either an initial value TAi in the idle speed control or a value reduced slightly from the initial value TAi by the learning control, so that the ISC-demanded throttle opening TAisc has a large value. In this case, therefore, the ISC-demanded throttle opening TAisc exceeds the reference value α so that the answer of Step S4 is negative.

While the vehicle is running, the engine speed is considerably high, and the accelerator pedal is depressed when the driving force is required. Therefore, the rotation of the engine 1 can be kept even if the throttle opening by the idle speed control is not especially enlarged. When the answer of Step S4 is negative because the ISC-demanded throttle opening TAisc exceeds the reference value α, therefore, an upper limit TAn1 of the standard throttle opening TAn in the idle speed control is adopted and added to the throttle opening which is determined on the basis of the target engine torque To and the engine speed Ne, to determine a demanded torque throttle opening TArq (at Step S5). Here, the upper limit TAn1 is a predetermined value smaller than the aforementioned reference value α.

When the answer of Step S4 is YES because the ISC-demanded throttle opening TAisc is smaller than the reference value α, on the contrary, the standard throttle opening TAn in the idle speed control is added to the throttle opening which is determined on the basis of the target engine torque To and the engine speed Ne, to determine the demanded torque throttle opening TArq (at Step S6). Moreover, the opening of the throttle valve is controlled (at Step S7) so as to achieve the demanded torque throttle opening TArq determined at Step S5 or Step S6.

The running state in the case where the control shown in FIG. 4 is made will be described with reference to the fuel consumption rate diagram illustrated in FIG. 5. When the target engine speed Net and the target engine torque To are determined on the basis of the accelerator opening θ and the vehicle speed V and when the engine 1 is controlled by adding the standard throttle opening TAi thereto in the idle speed control, the running point during the run substantially follows the optimum running line for the minimum fuel consumption so that the running state has the best fuel economy. When the initial value TAi is adopted as the ISC-demanded throttle opening TAisc, on the contrary, the running point seriously deviates from the optimum running line to a higher torque side, as indicated by a broken line in FIG. 5. By making the control of Step S5 of FIG. 4, however, the throttle opening to be added by the idle speed control is suppressed to the standard throttle opening TAn so that the deviation from the optimum running line is slight, as indicated by a single-dotted line in FIG. 5. By the construction to make the control shown in FIG. 4, therefore, it is possible to keep the idle run proper and to improve the fuel economy during the running.

Here will be briefly described the relation of the specific example thus far described and the invention. The functional means of Block B2 in FIGS. 1 and 3 corresponds to the target output calculating means in the invention; the functional means of Block B3 corresponds to the target output speed calculating means in the invention; the functional means of Block B3 corresponds to the gear ratio control means in the invention; the functional means of Block B5 corresponds to the target output torque calculating means in the invention; and the functional means of Block B6 corresponds to the load control means in the invention. In addition, the functional means of Block B7 shown in FIGS. 1 and 3 corresponds to the correction means in the invention.

On the other hand, the functional means of Blocks B8 and B9 and Block B3 shown in FIG. 3 correspond to the target speed correction means in the invention. Moreover, the functional means of Step S5 shown in FIG. 4 corresponds to the correction means in the invention.

Here, the example shown in FIG. 1 is constructed to correct the target engine torque by adding a corrected torque, as corrected with the idle load or the accessory load, to the target engine torque To determined on the basis of the demanded drive quantity. However, the invention should not be limited to that construction but may be modified such that the target output P is corrected with a corrected output based on the idle load correction or the accessory load correction. This correction of the output can be made by calculating the corrected output from the idle load torque or the accessory load torque, and the functional means for this output correction corresponds to the correction means in the invention. When the target output is thus corrected, the target engine speed Net can be determined on the basis of the corrected target output, to control the gear ratio of the continuously variable transmission 10. Thus, the engine 1 can be controlled along the optimum running line for the minimum fuel consumption.

In the invention, the target driving force F may also be corrected on the basis of the idle load correction or the accessory load correction. This correction of the driving force can be made by calculating the corrected driving force from the idle load torque or the accessory load torque, and the functional means for this driving force correction corresponds to the correction means in the invention. When the target driving force is thus corrected, the gear ratio of the continuously variable transmission 10 can be controlled by determining the target output and the target engine speed Net on the basis of the corrected target driving force, so that the engine 1 can be controlled along the optimum running line for the minimum fuel consumption.

Figure 5:
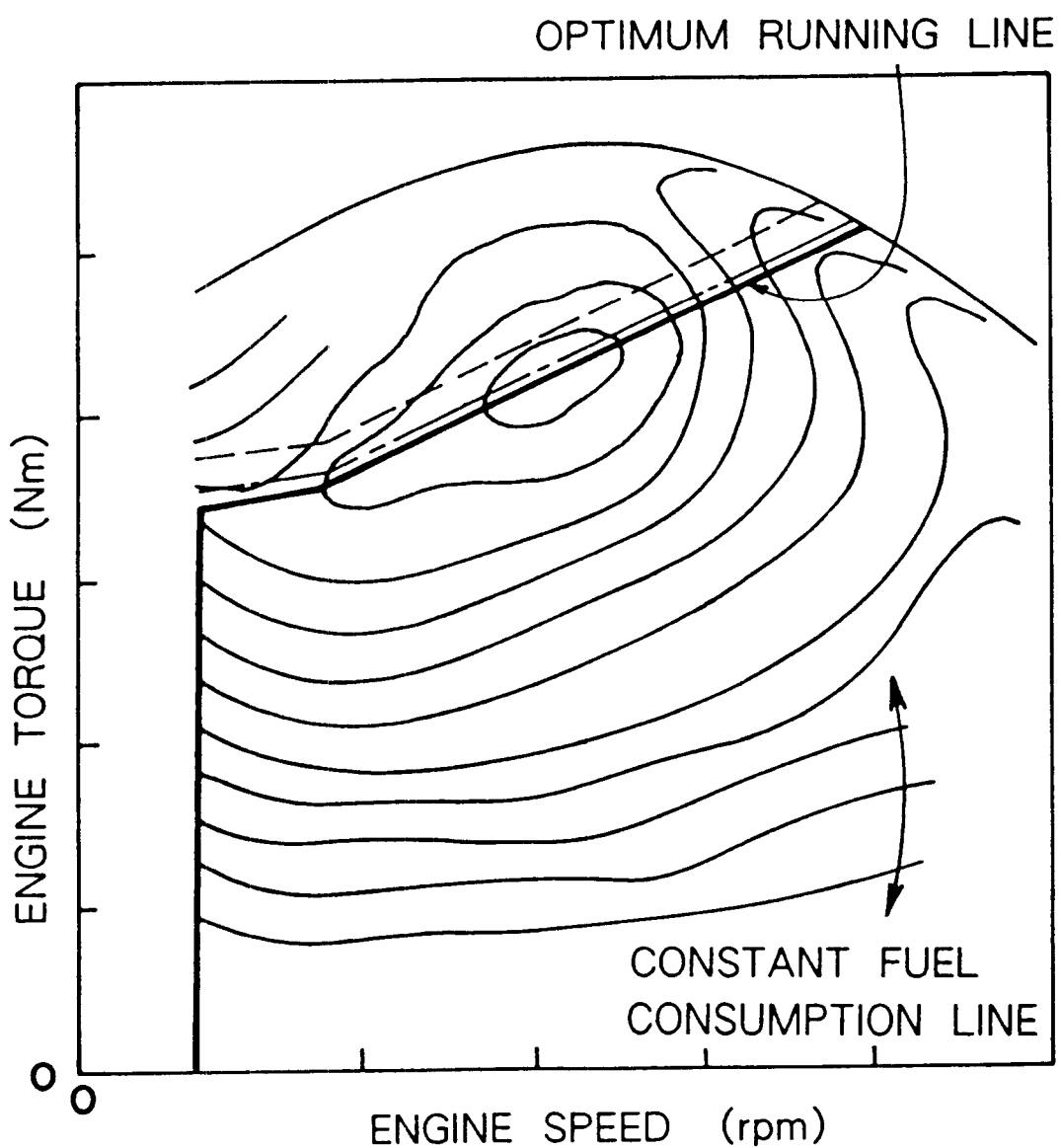
FIG. 5 is a diagram illustrating a running point in the case where the control shown in FIG. 4 is executed.

Moreover, the example shown in FIGS. 4 and 5 is constructed to restrict the throttle opening. In short, it is sufficient to suppress a serious deviation of the running point of the prime mover from the desirable running state in accordance with the correction. Therefore, the invention may also be constructed to restrict the correction of the target driving force, the target output or the target output torque. On the other hand, the restriction may be made in short by using the known values, which should not be limited to those specified in the specific examples. Moreover, the invention can be applied to a control system of not only the vehicle mounting only an internal combustion engine as the prime mover but also another type of vehicle such as a hybrid car mounting another prime mover such as an electric motor solely or in combination.

Here will be synthetically described the advantages to be obtained by the invention. According to the invention, the target output torque of the prime mover is determined on the basis of the target driving force, and the load of the prime mover is so corrected that the output torque for keeping the idle run of the prime mover may be added to that target output torque. Therefore, the prime mover can be controlled while reflecting not only the target driving force but also the load necessary for the idle run. As a result, the idle run can be kept proper.

According to the invention, on the other hand, the target output torque, as determined on the basis of the target driving force, is corrected by the corrected output torque for keeping the idle run, and the load of the prime mover is controlled on the basis of the corrected target output torque, so that the idle run can be kept proper.

According to the invention, moreover, the target output speed, as determined on the basis of the target driving force, is corrected on the basis of the accessory load. When the output torque is corrected for keeping the idle run, therefore, the output speed of the prime mover is corrected accordingly, so that the prime mover can be driven with minimum fuel consumption by utilizing the continuously variable transmission effectively.

According to the invention, still moreover, the target output speed of the prime mover incorporates the accessory load output so that it can be optimized even in the present of the accessory load.

According to the invention, furthermore, the target output providing a basis for determining the target output speed of the prime mover contains the corrected output for the idle run, so that the output speed of the prime mover can become proper for keeping the idle run to effect the drive with minimum fuel consumption.

According to the invention, on the other hand, the target driving force is corrected with the corrected driving force necessary for the idle run so that the target output speed and the target output torque of the prime mover are determined on the basis of the target driving force corrected. Therefore, the controls of the output torque and the output speed incorporating the load for keeping the idle run can be executed to keep the idle run proper and to effect the drive with minimum fuel consumption.

According to the invention, furthermore, the corrections for the target output torque, the target output speed, the target output and the target driving force are restricted, if over a predetermined value. As a result, the prime mover can be prevented from being driven in a manner deviating from the desirable state, thereby preventing the fuel economy lowering.

What is claimed is:

1. A control system for a vehicle provided with a continuously variable transmission, which has target output calculating means for determining a target output of a prime mover for achieving a target driving force, on the basis of said target driving force; target output speed calculating means for determining a target output speed on the basis of said target output; gear ratio control means for controlling a gear ratio of said continuously variable transmission so that an output speed of said prime mover may be said target output speed; target output torque calculating means for determining a target output torque of said prime mover for achieving said target driving force, on the basis of said target driving force; and load control means for controlling a load of said prime mover on the basis of said target output torque, comprising:

correction means for correcting a control quantity to control the load of said prime mover so that the output torque of said prime mover may have a sum of said target output torque and an output torque for keeping the idle run of said prime mover.

2. A control system according to claim 1,
    wherein said correction means includes means for determining a corrected output torque for keeping the idle run of said prime mover and correcting said target output torque on the basis of said corrected output torque.

3. A control system according to claim 2, further comprising:
    target speed correction means for correcting said target output speed on the basis of an accessory load.

4. A control system according to claim 3,
    wherein said target speed correction means includes means for determining an accessory load output for said accessory load and correcting said target output speed on the basis of said accessory load output.

5. A control system according to claim 1,
    wherein said correction means includes means for determining a corrected output for keeping the idle run of said prime mover and correcting said target output on the basis of said corrected output.

6. A control system according to claim 1,
    wherein said correction means includes means for determining a corrected driving force for keeping the idle run of said prime mover and correcting said target driving force on the basis of said corrected driving force.

7. A control system according to claim 1,
    wherein said correction means includes means for changing a corrected value for correcting said control quantity into a smaller value when said corrected value exceeds a predetermined value during the running of the vehicle.

8. A control system according to claim 2,
    wherein said correction means includes means for changing a corrected value for correcting said control quantity into a smaller value when said corrected value exceeds a predetermined value during the running of the vehicle.

9. A control system according to claim 3,
    wherein said correction means includes means for changing a corrected value for correcting said control quantity into a smaller value when said corrected value exceeds a predetermined value during the running of the vehicle.

10. A control system according to claim 4, wherein said correction means includes means for changing a corrected value for correcting said control quantity into a smaller value when said corrected value exceeds a predetermined value during the running of the vehicle.

11. A control system according to claim 5, wherein said correction means includes means for changing a corrected value for correcting said control quantity into a smaller value when said corrected value exceeds a predetermined value during the running of the vehicle.

12. A control system according to claim 6, wherein said correction means includes means for changing a corrected value for correcting said control quantity into a smaller value when said corrected value exceeds a predetermined value during the running of the vehicle.

\* \* \* \* \*